United States Patent
Cho et al.

(10) Patent No.: US 9,190,631 B2
(45) Date of Patent: Nov. 17, 2015

(54) BATTERY PACK

(71) Applicant: Samsung SDI Co., Ltd., Yongin-si, Gyeonggi-do (KR)

(72) Inventors: Mansik Cho, Yongin-si (KR); Sora Lee, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 226 days.

(21) Appl. No.: 13/917,310

(22) Filed: Jun. 13, 2013

(65) Prior Publication Data
US 2014/0212696 A1 Jul. 31, 2014

(30) Foreign Application Priority Data
Jan. 28, 2013 (KR) .......................... 10-2013-0009391

(51) Int. Cl.
*H01M 2/02* (2006.01)
*H01M 2/10* (2006.01)
*H01M 10/42* (2006.01)

(52) U.S. Cl.
CPC .......... *H01M 2/0202* (2013.01); *H01M 2/1022* (2013.01); *H01M 2010/4271* (2013.01)

(58) Field of Classification Search
CPC  H01M 2/1016; H01M 2/1022; H01M 2/0202
USPC ............................................................ 429/7
See application file for complete search history.

(56) References Cited

U.S. PATENT DOCUMENTS

| | | | | |
|---|---|---|---|---|
| 8,288,035 | B2* | 10/2012 | Li ................................. | 429/151 |
| 8,715,842 | B2* | 5/2014 | Lee et al. ......................... | 429/7 |
| 8,785,781 | B2* | 7/2014 | Park ............................ | 174/84 R |
| 8,916,286 | B2* | 12/2014 | Choi ............................ | 429/159 |
| 2010/0310922 | A1* | 12/2010 | Villarreal et al. ............. | 429/160 |
| 2011/0003193 | A1* | 1/2011 | Park et al. ...................... | 429/159 |
| 2011/0097619 | A1* | 4/2011 | Park ............................. | 429/159 |
| 2012/0045665 | A1* | 2/2012 | Park ................................. | 429/7 |

FOREIGN PATENT DOCUMENTS

| | | |
|---|---|---|
| JP | 2002-100334 (A) | 4/2002 |
| JP | 2011-014537 (A) | 1/2011 |
| KR | 10-2012-0025529 (A) | 3/2012 |

* cited by examiner

*Primary Examiner* — Stewart Fraser
(74) *Attorney, Agent, or Firm* — Knobbe, Martens, Olson & Bear, LLP

(57) ABSTRACT

A battery pack is disclosed. In one aspect, the battery pack includes a plurality of battery cells electrically connected to each other and comprising first and second outermost battery cells positioned at opposite ends thereof and a case accommodating the battery cells. The battery pack also includes a barrier wall formed between the battery cells and the case and a traversing tab positioned between the case and the barrier wall and electrically connecting the first and second outermost battery cells. At least one embodiment can facilitate a welding process while preventing a conductive tab connecting battery cells to a protective circuit module from being short-circuited.

19 Claims, 5 Drawing Sheets

BATTERY PACK

CROSS-REFERENCE TO RELATED APPLICATION

This application claims the benefit of Korean Patent Application No. 10-2013-0009391 filed on Jan. 28, 2013, the contents of which are incorporated herein by reference in their entirety.

BACKGROUND

1. Field

The described technology generally relates to a battery pack.

2. Description of the Related Technology

In general, a battery pack used in a portable electronic device, such as a notebook computer, a personal digital assistant (PDA) or a camcorder is manufactured by incorporating multiple battery cells into the battery pack to provide sufficient energy storage to power the device. The battery pack generally includes i) a lower case, ii) a plurality of battery cells accommodated in the lower case, iii) a protective circuit module (PCM) electrically connected to the battery cells and controlling charge/discharge operation of the battery cells, and iv) an upper case covering the lower case and protecting the battery cells and the PCM from external surroundings. Here, the battery cells may be high-capacity cylindrical lithium ion batteries. The PCM is electrically connected to the battery cells by a tab made of, for example, nickel (Ni) or a conductive wire.

SUMMARY

One inventive aspect is a battery pack, which can facilitate a welding process while preventing a conductive tab connecting battery cells to a protective circuit module from being short-circuited.

Another aspect is a battery pack including a plurality of battery cells, a case accommodating the plurality of battery cells, a barrier wall formed between the plurality of battery cells and the case, and a traversing tab positioned between the case and the barrier wall and electrically connecting battery cells positioned at opposite ends among the plurality of battery cells.

The barrier wall may be spaced apart from one surface of the case to be shaped of a plate and may be located corresponding to a region where the battery cells to which the traversing tab is not connected are positioned.

In addition, the barrier wall may have a plurality of throughholes formed therein.

The traversing tab may include a main plate extending in a direction in which the plurality of battery cells are arranged, a first connecting part formed at one side of the main plate, a second connecting part formed at the other side of the main plate, a first coupling part coupling the first connecting part to the main plate, and a second couplirig part coupling the second connecting part to the main plate.

The main plate may have protrusion holes formed therein, and the protrusion holes are engaged with protrusions formed on the case.

In addition, the main plate may be positioned between the case and the barrier wall, and a length of the main plate may be corresponding to a length of the barrier wall.

The first connecting part and the second connecting part may be spaced apart from the main plate to be parallel with each other.

In addition, the first connecting part may be electrically to the outermost battery cell positioned at one end among the plurality of battery cells, and the second connecting part may be electrically to the outermost battery cell positioned at the other end among the plurality of battery cells.

The first coupling part and the second coupling part may be formed to be tilted.

The main plate may be formed at one side of the barrier wall, and the first connecting part, the second connecting part, the first coupling part and the second coupling part may be formed at the other side of the barrier wall.

The battery pack may further include a connecting tab electrically connecting neighboring battery cells among the plurality of battery cells, wherein the barrier wall is positioned between the connecting tab and the traversing tab.

The battery pack may further include a protective circuit module centrally positioned on the plurality of battery cells, and a positive electrode tab and a negative electrode tab electrically connecting the protective circuit module to the plurality of battery cells.

The barrier wall may be positioned between the positive electrode tab and the traversing tab.

The positive electrode tab and the negative electrode tab may be formed to be opposite to each other.

In addition, the positive electrode tab and the negative electrode tab may be electrically connected to the centrally positioned battery cell among the plurality of battery cells.

The case may include a lower case accommodating the plurality of battery cells and an upper case combined with the lower case, the lower case may have a bottom surface on which the plurality of battery cells are placed, and a pair of long side surfaces and a pair of short side surfaces and upwardly extending from the bottom surface, and the long side surfaces may be parallel with a direction in which the plurality of battery cells are arranged.

The barrier wall may be formed in the lower case and is parallel with the long side surfaces.

In addition, the barrier wall may be integrally formed with the lower case.

The plurality of battery cells may be cylindrical secondary batteries.

In addition, the plurality of battery cells may be arranged in parallel such that positive and negative electrodes thereof are exposed and an odd number of battery cells are provided.

Another aspect is a battery pack comprising: a plurality of battery cells electrically connected to each other and including first and second outermost battery cells positioned at opposite ends thereof; a case accommodating the battery cells; a barrier wall formed between the battery cells and the case; and a traversing tab positioned between the case and the barrier wall and electrically connecting the first and second outermost battery cells.

In the above battery pack, the barrier wall is spaced apart from one surface of the case to have a plate shape and is located to correspond to a region where the battery cells to which the traversing tab is not connected are positioned. In the above battery pack, a plurality of throughholes are formed in the barrier wall.

In the above battery pack, the traversing tab comprises: a main plate extending in a direction in which the battery cells are arranged, wherein the main plate comprises first and second sides formed at opposite ends thereof; a first connecting part formed at the first side of the main plate; a second connecting part formed at the second side of the main plate; a first coupling part coupling the first connecting part to the main plate; and a second coupling part coupling the second connecting part to the main plate.

In the above battery pack, a plurality of protrusion holes are formed in the main plate, wherein a plurality of protrusions are formed on the case, and wherein the protrusion holes are configured to be engaged with the protrusions. In the above battery pack, the main plate is positioned between the case and the barrier wall, and wherein the length of the main plate corresponds to the length of the barrier wall. In the above battery pack, the first and second connecting parts are spaced apart from the main plate to be substantially parallel with each other.

In the above battery pack, the first connecting part is electrically connected to the first outermost battery cell, and wherein the second connecting part is electrically connected to the second outermost battery cell. In the above battery pack, the first and second coupling parts are tilted with respect to the main plate. The above battery pack further comprises a connecting tab electrically connecting neighboring battery cells, wherein the barrier wall is positioned between the connecting tab and the traversing tab. The above battery pack further comprises: a protective circuit module centrally positioned on the battery cells; and a positive electrode tab and a negative electrode tab electrically connecting the protective circuit module to the battery cells.

In the above battery pack, the barrier wall is positioned between the positive electrode tab and the traversing tab. In the above battery pack, the battery cells comprise at least one centrally positioned battery cell, and wherein the positive and negative electrode tabs are electrically connected to the centrally positioned battery cell. In the above battery pack, the case includes a lower case accommodating the battery cells and an upper case combined with the lower case, wherein the lower case has i) a bottom surface on which the battery cells are placed, and ii) a pair of long side surfaces and a pair of short side surfaces upwardly extending from the bottom surface, and wherein the long side surfaces are substantially parallel with a direction in which the battery cells are arranged.

In the above battery pack, the barrier wall is formed in the lower case and is substantially parallel with the long side surfaces. In the above battery pack, the barrier wall is integrally formed with the lower case. In the above battery pack, the battery cells are arranged in substantially parallel with each other, and wherein the number of the battery cells is odd.

Another aspect is a battery pack comprising: a plurality of battery cells electrically connected to each other and including first and second outermost battery cells positioned at opposite ends thereof; a lower case accommodating the battery cells, wherein the lower case comprises an internal side surface; an upper case covering the lower case; a barrier wall residing in the lower case and disposed between the internal side surface of the lower case and electrode terminals of the battery cells; and a traversing tab positioned between the internal side surface of the lower case and the barrier wall and electrically connecting the first and second outermost battery cells.

In the above battery pack, the traversing tab comprises: a substantially linear portion extending in a direction in which the battery cells are arranged and contacting the barrier wall, wherein the substantially linear portion comprises first and second sides formed at opposite ends thereof; a first non-linear portion non-linearly extending from the first side of the substantially linear portion and contacting the first outermost battery cell; and a second non-linear portion non-linearly extending from the second side of the substantially linear portion and contacting the second outermost battery cell.

Another aspect is a battery pack comprising: a plurality of battery cells electrically connected to each other and comprising first and second outermost battery cells positioned at opposite ends thereof; a lower case accommodating the battery cells, wherein the lower case comprises an internal side surface; an upper case covering the lower case; a barrier wall residing in the lower case and disposed between the internal side surface of the lower case and electrode terminals of the battery cells; and means for electrically connecting the first and second outermost battery cells, wherein the connecting means is positioned between the internal side surface of the lower case and the barrier wall.

DETAILED DESCRIPTION

Figure 1:
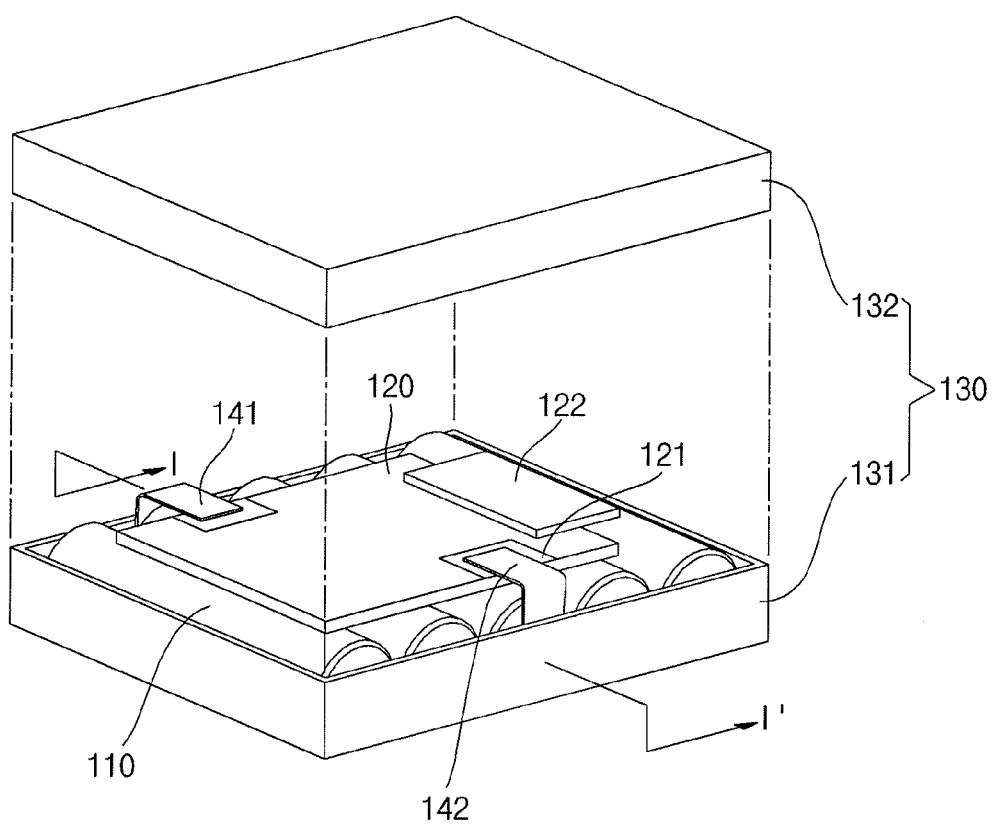
FIG. 1 is a perspective view of a battery pack according to an embodiment.
Figure 2:
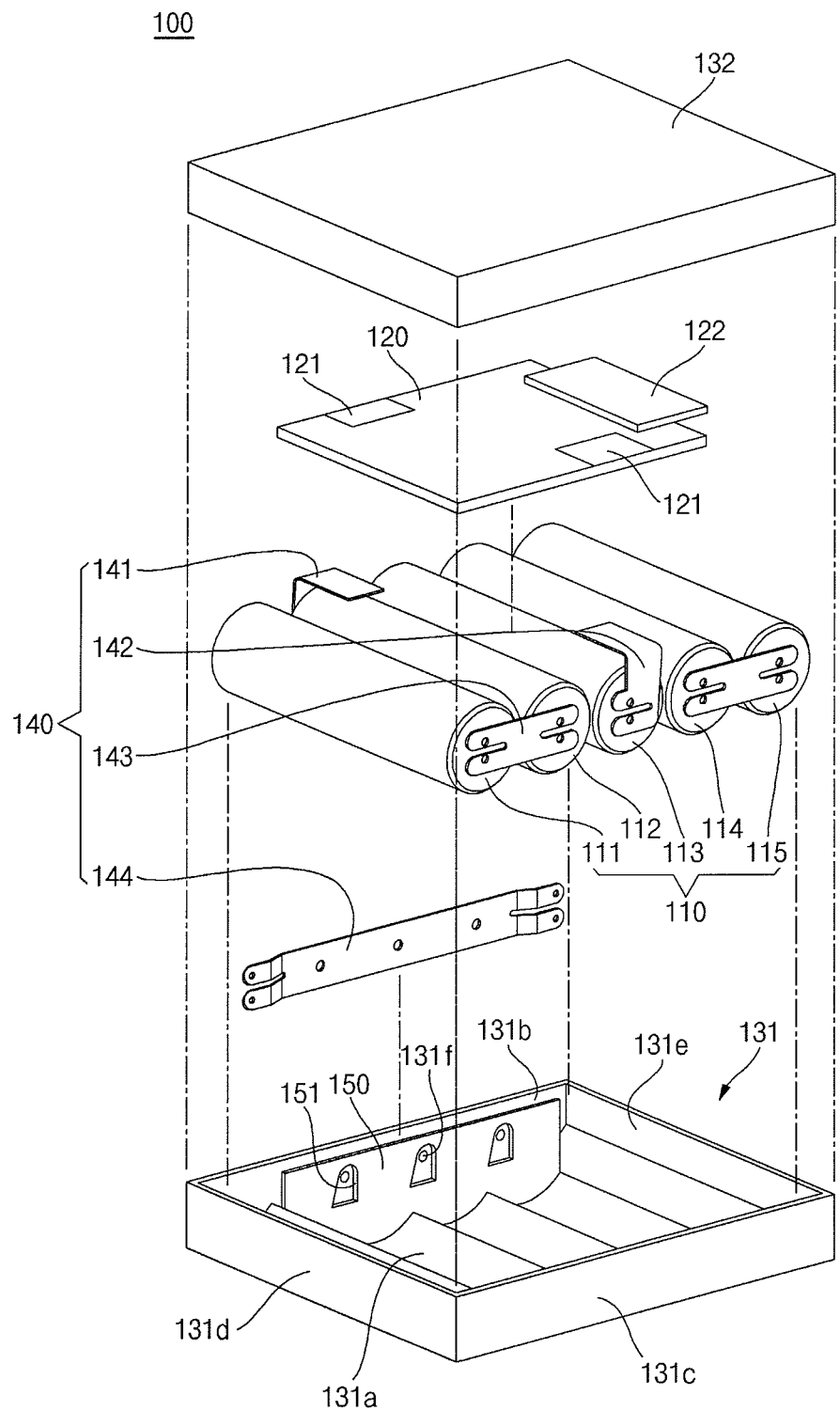
FIG. 2 is an exploded perspective view of the battery pack shown in FIG. 1.

Hereinafter, embodiments will be described in detail with reference to the accompanying drawings.

Referring to FIGS. 1 to 6, a battery pack 100 includes a plurality of battery cells 110, a protective circuit module (PCM) 120, a case 130, a plurality of conductive tabs 140 and a barrier wall 150.

Figure 6:
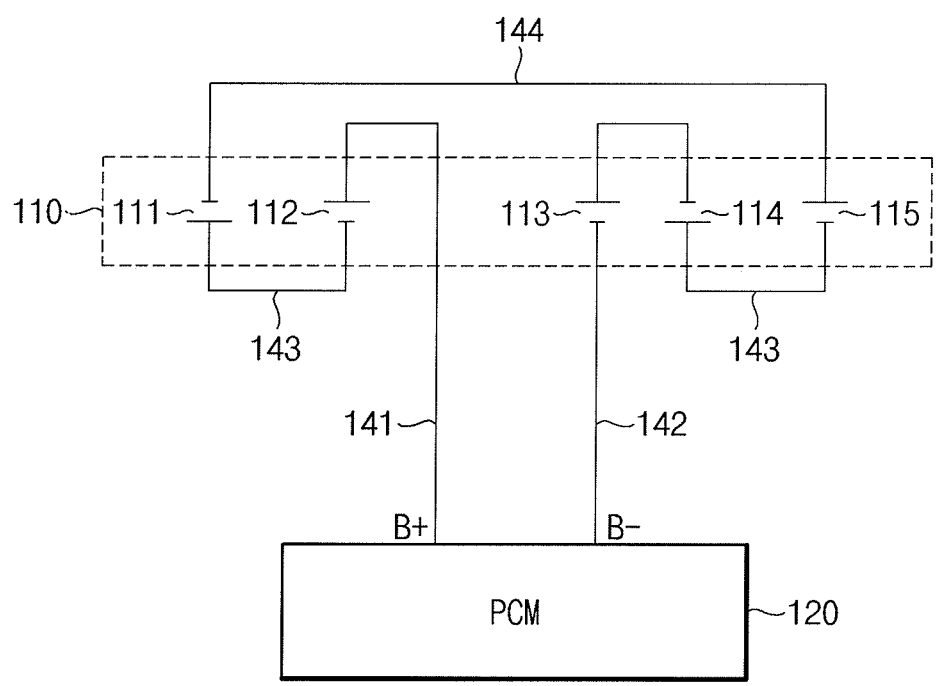
FIG. 6 is a circuit view of a battery cell shown in FIG. 1.

In one embodiment, the battery cells 110 are cylindrical secondary (rechargeable) batteries that can be charged and discharged multiple times. One side of each of the battery cells 110 has a positive electrode, and the other side has a negative electrode. Multiple battery cells 110 constitute one battery pack 100. Here, the battery cells 110 are arranged in substantially parallel with each other such that their positive and negative electrodes are connected to each other in series by the conductive tabs 140. In the illustrated embodiment, the number of the battery cells 110 is 5, but the present invention does not limit the number of the battery cells 110 to 5. However, in order to make plus and minus terminals of the battery cells 110 connected to each other in series positioned opposite to each other, an odd number of the battery cells 110 may be provided. The battery cells 110 will now be defined as a first battery cell 111, a second battery cell 112, a third battery cell 113, a fourth battery cell 114 and a fifth battery cell 115. As shown in FIG. 6, the battery cells 111-115 are electrically connected to the PCM 120 via conductive tabs 141, 142 and 144 which will be described later.

Figure 5:
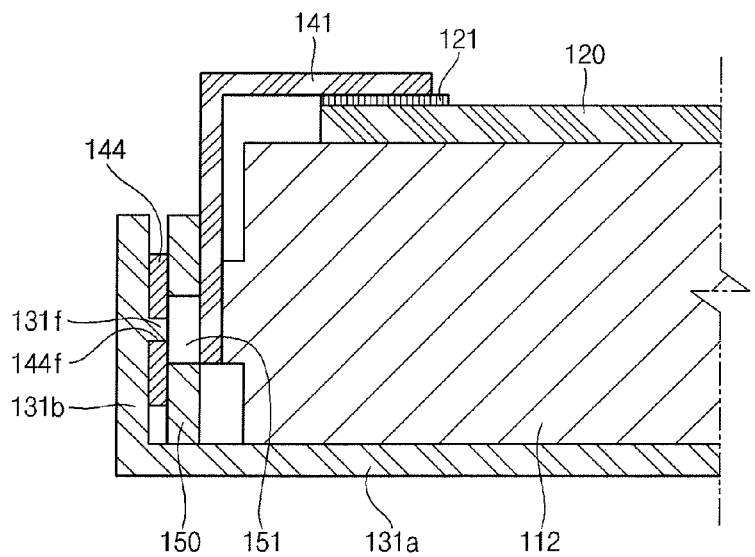
FIG. 5 is a cross-sectional view of illustrating a portion of the battery pack shown in FIG. 1, taken along the line I-I.

Referring to FIG. 5, the positive electrode of the second battery cell 112 becomes a plus terminal (B+) of the battery pack 100, and the negative electrode of the third battery cell 113 becomes a minus terminal (B−) of the battery pack 100. The conductive tabs 140 are connected to the plus terminal (B+) and the minus terminal (B−) to be electrically connected to the PCM 120. Here, the battery cells whose positive and negative electrodes are determined as the plus and minus terminals (B+) and (B−) of the battery pack 100 may be battery cells positioned at opposite ends among the battery cells. In one embodiment, since the PCM 120 is centrally positioned on the battery cells 110, a centrally positioned battery cell among the battery cells may be designated as the battery cell determined to have the plus and minus terminals (B+) and (B−) of the battery pack 100 to facilitate connection between the plus and minus terminals (B+) and (B−) of the battery pack 100 to the PCM 120. In addition, the conductive tabs 140 may be plurally formed to connect the battery cells 110 to each other in series. The conductive tabs 140 will later be described in more detail.

The PCM 120 is centrally placed on the battery cells 110. The PCM 120 is electrically connected to the battery cells 110 through the conductive tabs 140 and prevents the battery cells 110 from being over-charged or over-discharged. A plurality of semiconductor devices (not shown) are formed in the PCM 120, and conductive pads 121 are provided to connect the PCM 120 to the battery cells 110. The conductive tabs 140 are connected to the conductive pads 121 to be electrically connected to the plus and minus terminals (B+) and (B−) of the battery pack 100. The conductive pads 121 are formed at opposite sides of the PCM 120 and are located to correspond to the conductive tabs 140 connected to the plus and minus terminals (B+) and (B−) of the battery pack 100. In addition, a connector 122 is formed at one side of the PCM 120, and the PCM 120 may be electrically connected to an external device (not shown) through the connector 122. The connector 122 is formed on a side surface of the PCM 120 where the conductive pads 121 are not formed.

The case 130 accommodates the battery cells 110 and the PCM 120 and includes a lower case 131 on which the battery cells 110 and the PCM 120 are placed and an upper case 132 covering the lower case 131.

The lower case 131 may be shaped of a top end opened box to receive the battery cells 110. The upper case 132 may be coupled to the top end of the lower case 131. In addition, a hole (not shown) for exposing the connector 122 to the outside may be formed at one side of the upper case 132.

The lower case 131 has a bottom surface 131a and four side surfaces 131b, 131c, 131d and 131e upwardly extending from the bottom surface 131a. The side surfaces 131b, 131c, 131d and 131e include first and second long side surfaces 131b and 131c and first and second short side surfaces 131d and 131e. In some embodiments, in order to fixedly place the battery cells 110 on the bottom surface 131a of the lower case 131, curves are formed to be shaped to correspond to the external surface formed by the battery cells 110. Since the first and second long side surfaces 131b and 131c are substantially parallel to a direction in which the battery cells 110 accommodated in the lower case 131 are arranged, their lengths may increase or decrease according to the number of battery cells 110 accommodated in the lower case 131. In one embodiment, since the first and second short side surfaces 131d and 131e are formed to correspond to the lengths of the battery cells 110 (that is, lengths between positive and negative electrodes of the battery cells 110), the lengths of the first and second short side surfaces 131d and 131e are fixed irrespective of the number of the battery cells 110 accommodated in the lower case 131. In addition, a plurality of fixing protrusions 131f may be formed inside the first long side surface 131b. The fixing protrusions 131f may be formed to fix a traversing tab 144 to be described later.

The conductive tabs 140 are connected to the positive or negative electrodes of the battery cells 110 to electrically connect the battery cells 110. The conductive tabs 140 may be made of one selected from the group consisting of nickel (Ni), copper (Cu), aluminum (Al) and equivalents thereof. The conductive tabs 140 include a positive electrode tab 141, a negative electrode tab 142, a connecting tab 143 and a traversing tab 144.

The positive electrode tab 141 is electrically connected to the plus terminal (B+) of the battery pack 100. In addition, the positive electrode tab 141 is connected to the centrally positioned battery cell among the battery cells 110. In one embodiment, as described above, since the PCM 120 is centrally positioned on the battery cells 110, the positive electrode tab 141 is connected to the centrally positioned battery cell to facilitate connection between the PCM 120 and the battery cells 110. In some embodiments, since the plus terminal (B+) of the battery pack 100 is a positive electrode of the second battery cell 112, the positive electrode tab 141 is electrically connected to the positive electrode of the second battery cell 112. Here, the positive electrode tab 141 may be connected to the positive electrode of the second battery cell 112 by welding. In one embodiment, the positive electrode tab 141 is substantially 'L' shaped and has a bent part. In view of the bent part, one side of the positive electrode tab 141 is connected to the positive electrode of the second battery cell 112, and the other side of the positive electrode tab 141 is connected to the conductive pads 121 of the PCM 120.

The negative electrode tab 142 is electrically connected to the minus terminal (B−) of the battery pack 100. In addition, the negative electrode tab 142 is connected to the centrally positioned battery cell among the battery cells 110. In addition, the negative electrode tab 142 is positioned opposite to the positive electrode tab 141 to prevent electrical short circuiting therebetween. The negative electrode tab 142 may be electrically connected to the negative electrode of the third battery cell 113 by welding. The negative electrode tab 142 may have substantially the same shape as the positive electrode tab 141. In view of the bent part, one side of the negative electrode tab 142 is connected to the negative electrode of the third battery cell 113, and the other side of the negative electrode tab 142 is connected to the conductive pads 121 of the PCM 120.

The connecting tab 143 electrically connects neighboring battery cells. The connecting tab 143 may be plurally formed according to the number of the battery cells 110. The connecting tab 143 may be electrically connected to positive and negative electrodes of neighboring battery cells 110 by welding. In one embodiment, the connecting tab 143 is substantially '−'shaped. The connecting tab 143 connects the first battery cell 111 to the second battery cell 112, connects the third battery cell 113 to the fourth battery cell 114 and connects the fourth battery cell 114 to the fifth battery cell 115. For example, one side of the connecting tab 143 is connected to the positive electrode of the first battery cell 111 and the other side of the connecting tab 143 is connected to the negative electrode of the second battery cell 112. In addition, one side of the connecting tab 143 is connected to the positive electrode of the third battery cell 113 and the other side of the connecting tab 143 is connected to the negative electrode of the fourth battery cell 114. In addition, one side of the connecting tab 143 is connected to the positive electrode of the fourth battery cell 114 and the other side of the connecting tab 143 is connected to the negative electrode of the fifth battery cell 115.

The traversing tab 144 electrically connects battery cells positioned at opposite ends of the battery cells 110. The positive and negative electrode tabs 141 and 142 are connected to the centrally positioned one of the battery cells 110. In order to connect the battery cells 110 to each other in series, one embodiment electrically connects the battery cells positioned at opposite ends of the battery cells 110. That is to say, the traversing tab 144 is a tab formed when the positive electrode tab 141 and the negative electrode tab 142 are connected to the centrally positioned battery cell. The traversing tab 144 electrically connects the first battery cell 111 to the fifth battery cell 115. In detail, the traversing tab 144 is connected to the negative electrode of the first battery cell 111 and the positive electrode of the fifth battery cell 115. In addition, the traversing tab 144 is positioned between the case 130 and the barrier wall 150.

Figure 3A:
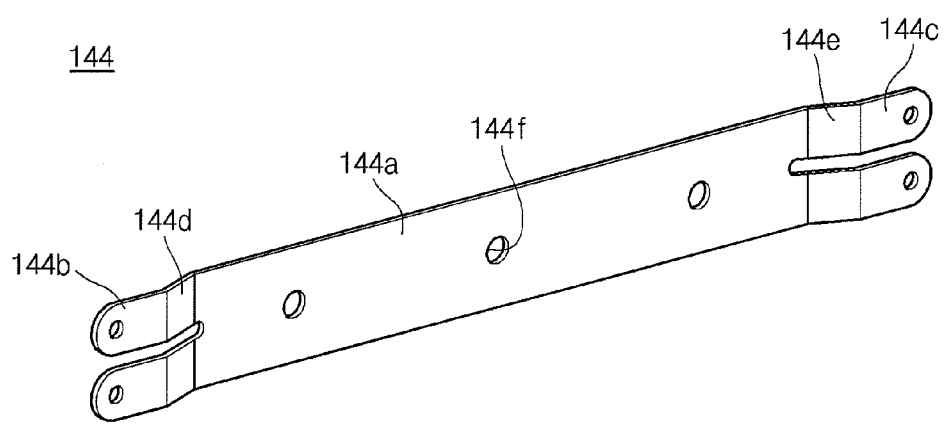
FIGS. 3A and 3B are a perspective view and a cross-sectional view of a traversing tab shown in FIG. 2.
Figure 3B:
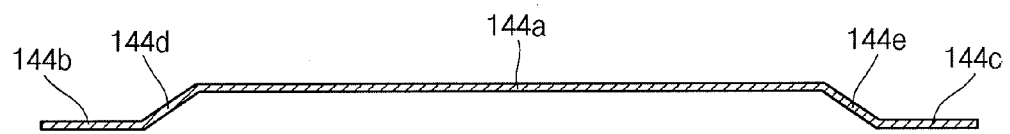
Figure 4:
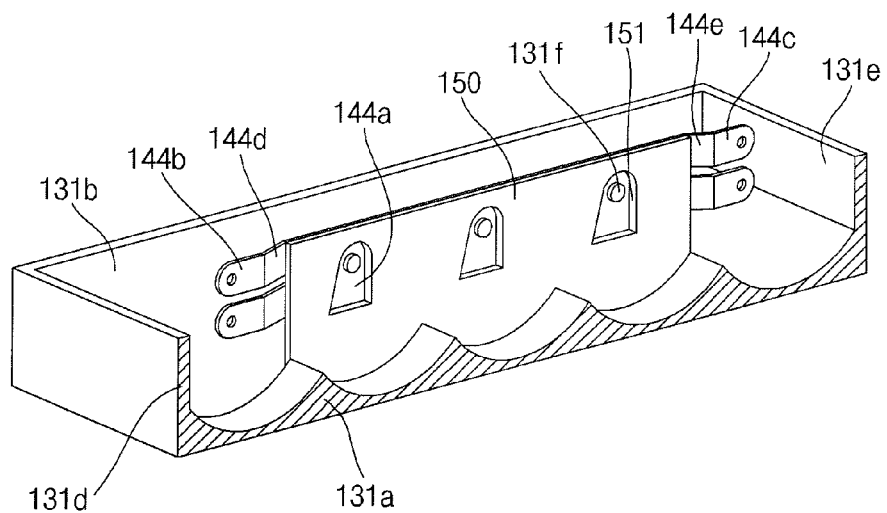
FIG. 4 is a perspective view illustrating a state in which the traversing tab shown in FIG. 2 is combined with a lower case.

Referring to FIGS. 3A to 4, the traversing tab 144 includes a main plate 144a, a first connecting part 144b, a second connecting part 144c, a first coupling part 144d and a second coupling part 144e. The main plate 144a may be a substantially linear portion. The first connecting part 144b and first coupling part 144d may be a first non-linear portion that non-linearly extends from one side of the main plate 144a. The second connecting part 144c and a second coupling part 144e may be a second non-linear portion that non-linearly extends from the other opposing side of the main plate 144a.

In one embodiment, the main plate 144a extends in a direction in which the battery cells 110 are arranged. The main plate 144a may have a plate shape and extend from the first battery cell 111 to the fifth battery cell 115. In addition, the main plate 144a is positioned between the lower case 131 and the barrier wall 150. The main plate 144a may have a plurality of protrusion holes 144f formed therein. The protrusion holes 144f are engaged with the fixing protrusions 131f formed in the lower case 131. Therefore, the main plate 144a is combined with the lower case 131. The first coupling part 144d and the first connecting part 144b are connected to one end of the main plate 144a, and the second coupling part 144e and the second connecting part 144c are connected to the other end of the main plate 144a.

The first connecting part 144b is positioned at one side of the main plate 144a and is electrically connected to the negative electrode of the first battery cell 111. Here, the first connecting part 144b may be connected to the first battery cell 111 by welding or contacting. The first connecting part 144b is spaced apart from the main plate 144a to be substantially parallel with the main plate 144a. The first coupling part 144d connects the main plate 144a to the first connecting part 144b. In addition, the first coupling part 144d is tilted to connect the main plate 144a and the first connecting part 144b spaced apart from each other. The first connecting part 144b and the first coupling part 144d are positioned between the lower case 131 and the first battery cell 111. That is to say, the first connecting part 144b and the main plate 144a are positioned opposite to each other with the barrier wall 150 interposed therebetween.

The second connecting part 144c is positioned at the other side of the main plate 144a and is electrically connected to the positive electrode of the fifth battery cell 115. Here, the second connecting part 144c may be connected to the fifth battery cell 115 by welding or contacting. The second connecting part 144c is spaced apart from the main plate 144a to be substantially parallel with the main plate 144a. The second coupling part 144e connects the main plate 144a to the second connecting part 144c. In addition, the second coupling part 144e is tilted to connect the main plate 144a and the second connecting part 144c spaced apart from each other. The second connecting part 144c and the second coupling part 144e are positioned between the lower case 131 and the fifth battery cell 115. That is to say, the second connecting part 144c and the main plate 144a are positioned opposite to each other with the barrier wall 150 interposed therebetween.

The barrier wall 150 is formed between the battery cells 110 and the case 130 and prevents the conductive tabs 140 from being short-circuited. The barrier wall 150 is positioned within the lower case 131 and is spaced a predetermined distance apart from the first long side surface 131b of the lower case 131. The barrier wall 150 prevents the traversing tab 144 from being short-circuited from the positive electrode tab 141, the negative electrode tab 142 or the connecting tab 143. Therefore, the barrier wall 150 may be formed between the traversing tab 144 and the positive electrode tab 141, between the traversing tab 144 and the connecting tab 143 or between the traversing tab 144 and the negative electrode tab 142. In some embodiments, since the traversing tab 144 is formed across the positive electrode tab 141 and the connecting tab 143, the barrier wall 150 is formed between the traversing tab 144 and each of the positive electrode tab 141 and the connecting tab 143.

For example, the barrier wall 150 is spaced apart from the first long side surface 131b of the lower case 131 to have a plate shape. In some embodiments, the barrier wall 150 is not formed to have the same length as the first long side surface 131b but is formed only at regions where the second, third and fourth battery cells 112-114 are located. For example, the first and second connecting parts 144b and 144c of the traversing tab 144 are connected to the first and fifth battery cells 111 and 115, respectively. That is to say, the barrier wall 150 is located to correspond to regions where the battery cells other than the battery cells positioned at opposite ends of the battery cells 110 are formed. Therefore, the barrier wall 150 may prevent the traversing tab 144 from being short-circuited from the positive electrode tab 141 and the connecting tab 143.

In addition, the barrier wall 150 may be integrally formed with the lower case 131. Therefore, in order to facilitate injection molding of the lower case 131, a plurality of throughholes 151 may be formed in the barrier wall 150. The throughholes 151 may be formed at locations to correspond to the fixing protrusions 131f formed in the lower case 131. The barrier wall 150 may have only one throughhole 151.

According to at least one of the disclosed embodiments, a barrier wall is formed within a case, thereby preventing a traversing tab crossing a plurality of battery cells from being short-circuited from a conductive tab. In addition, electrode tabs connecting a protective circuit module to battery cells are centrally positioned on the battery cells, thereby facilitating connection between the protective circuit module and the electrode tabs.

Although the above embodiments have been described with reference to the accompanying drawings, it will be understood by those skilled in the art that a variety of modifications and variations may be made to the present invention without departing from the spirit or scope of the present invention defined in the appended claims, and their equivalents.

What is claimed is:

1. A battery pack comprising:
    a plurality of battery cells electrically connected to each other and including first and second outermost battery cells positioned at opposite ends thereof;
    a case accommodating the battery cells;
    a barrier wall formed between the battery cells and the case and disposed to be parallel with a direction in which the battery cells are arranged; and
    a traversing tab positioned between the case and the barrier wall and contacting only the first and second outermost battery cells among the battery cells,
    wherein the barrier wall is spaced apart from one surface of the case to have a plate shape and is located to correspond to a region where the battery cells to which the traversing tab is not connected are positioned.

2. The battery pack of claim 1, wherein a plurality of throughholes are formed in the barrier wall.

3. The battery pack of claim 1, wherein the traversing tab comprises:

a main plate extending in a direction in which the battery cells are arranged, wherein the main plate comprises first and second sides formed at opposite ends thereof;

a first connecting part formed at the first side of the main plate;

a second connecting part formed at the second side of the main plate;

a first coupling part coupling the first connecting part to the main plate; and a second coupling part coupling the second connecting part to the main plate.

4. The battery pack of claim 3, wherein a plurality of protrusion holes are formed in the main plate, wherein a plurality of protrusions are formed on the case, and wherein the protrusion holes are configured to be engaged with the protrusions.

5. The battery pack of claim 3, wherein the main plate is positioned between the case and the barrier wall, and wherein the length of the main plate corresponds to the length of the barrier wall.

6. The battery pack of claim 3, wherein the first and second connecting parts are spaced apart from the main plate to be substantially parallel with each other.

7. The battery pack of claim 3, wherein the first connecting part is electrically connected to the first outermost battery cell, and wherein the second connecting part is electrically connected to the second outermost battery cell.

8. The battery pack of claim 3, wherein the first and second coupling parts are tilted with respect to the main plate.

9. The battery pack of claim 3, wherein the main plate is formed at one side of the barrier wall, and the first connecting part, the second connecting part, the first coupling part and second coupling part are formed at the other side of the barrier wall.

10. The battery pack of claim 1, further comprising a connecting tab electrically connecting neighboring battery cells, wherein the barrier wall is positioned between the connecting tab and the traversing tab.

11. The battery pack of claim 1, further comprising:

a protective circuit module centrally positioned on the battery cells; and a positive electrode tab and a negative electrode tab electrically connecting the protective circuit module to the battery cells.

12. The battery pack of claim 11, wherein the barrier wall is positioned between the positive electrode tab and the traversing tab.

13. The battery pack of claim 11, wherein the battery cells comprise at least one centrally positioned battery cell, and wherein the positive and negative electrode tabs are electrically connected to the centrally positioned battery cell.

14. The battery pack of claim 1, wherein the case includes a lower case accommodating the battery cells and an upper case combined with the lower case, wherein the lower case has i) a bottom surface on which the battery cells are placed, and ii) a pair of long side surfaces and a pair of short side surfaces upwardly extending from the bottom surface, and wherein the long side surfaces are substantially parallel with a direction in which the battery cells are arranged.

15. The battery pack of claim 14, wherein the barrier wall is formed in the lower case and is substantially parallel with the long side surfaces.

16. The battery pack of claim 14, wherein the barrier wall is integrally formed with the lower case.

17. The battery pack of claim 1, wherein the battery cells are arranged in substantially parallel with each other, and wherein the number of the battery cells is odd.

18. A battery pack comprising:

a plurality of battery cells electrically connected to each other and including first and second outermost battery cells positioned at opposite ends thereof;

a lower case accommodating the battery cells, wherein the lower case comprises an internal side surface;

an upper case covering the lower case;

a barrier wall residing in the lower case and disposed between the internal side surface of the lower case and electrode terminals of the battery cells and disposed to be parallel with a direction in which the battery cells are arranged; and a traversing tab positioned between the internal side surface of the lower case and the barrier wall and contacting only the first and second outermost battery cells among the battery cells, wherein the barrier wall is spaced apart from one surface of the lower case to have a plate shape and is located to correspond to a region where the battery cells to which the traversing tab is not connected are positioned.

19. The battery pack of claim 18, wherein the traversing tab comprises:

a substantially linear portion extending in a direction in which the battery cells are arranged and contacting the barrier wall, wherein the substantially linear portion comprises first and second sides formed at opposite ends thereof;

a first non-linear portion non-linearly extending from the first side of the substantially linear portion and contacting the first outermost battery cell; and a second non-linear portion non-linearly extending from the second side of the substantially linear portion and contacting the second outermost battery cell.

* * * * *